Oct. 2, 1934.    M. BORCHEK ET AL    1,975,346
SAND PROJECTOR
Filed Feb. 1, 1933
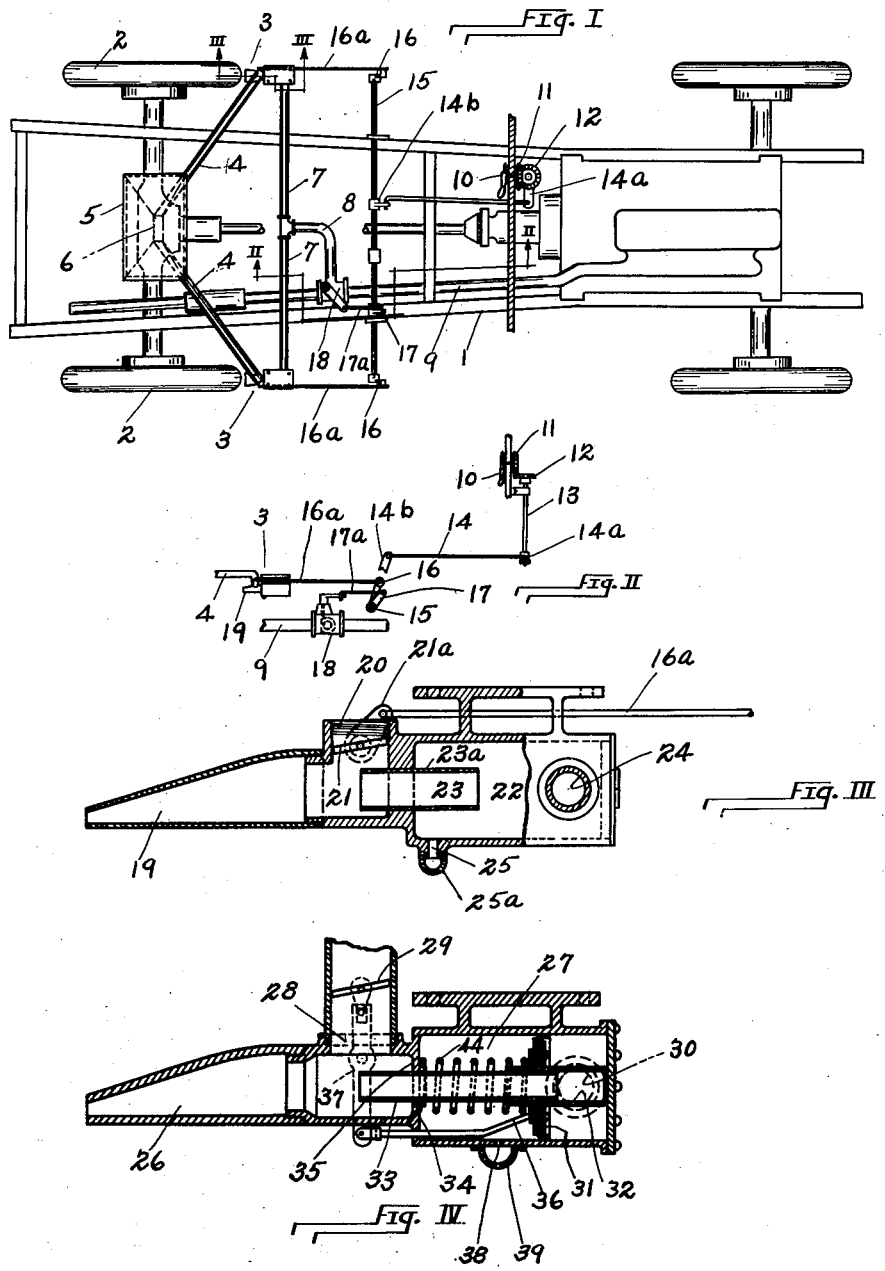
INVENTOR
Mathew Borchek and
Harry Fingal
by Christy Christy and Wharton
their attorneys Patented Oct. 2, 1934

1,975,346

UNITED STATES PATENT OFFICE

1,975,346

SAND PROJECTOR

Mathew Borchek and Harry Fingal, Pittsburgh, Pa.

Application February 1, 1933, Serial No. 654,656

11 Claims. (Cl. 291—3)

This invention relates to a sand projector for use on power-propelled vehicles, to increase traction at the will of the vehicle operator, and to prevent or check skidding of the vehicle.

We are aware that apparatus of various structure has heretofore been devised to supply sand beneath and around the wheels of an automobile. We are also aware that apparatus has been devised to perform this operation, in which sand has been projected beneath and around the wheels of an automobile by the fluid pressure medium provided by the exhaust of an internal combustion engine which drives the vehicle.

In conducting experiments with the projection of sand beneath and around the wheels of an automobile, utilizing alternatively the fluid pressure provided by the exhaust of the automobile and the fluid pressure provided for operating the brakes of an automobile, we have discovered that both these pressure mediums, and particularly the engine exhaust, contain a relatively great quantity of entrained moisture. We discovered that if sand be supplied to a sand receptacle in dry condition, and if the receptacle and the connections leading therefrom be adequately sealed, the sand may be delivered to a projector nozzle in substantially dry condition, in which it will flow readily, without the use of special means or arrangements for applying a drying heat to the sand. It was our experience, however, that the moisture entrained with the engine exhaust gas, or other fluid pressure medium coming in contact with the sand in the nozzle acts to so moisten the sand as to cause it to pack in the nozzle, without the projection of any substatnial quantity of sand in the desired manner.

The primary object of our invention is, therefore, to provide apparatus in which moisture entrained with the exhaust from an internal combustion engine, or other suitable fluid pressure medium, is precipitated before the gas comes into contact with the sand which is to be projected.

Another object of our invention is to provide simple and positive means by which sand is released to a projector nozzle, and gas under pressure released to project the sand by a single operating control accessible to the driver of the vehicle.

In the accompanying drawing Figure I is a plan view showing the chassis of an automobile with a sanding system, including a projector of our special type, mounted thereon; Figure II is a fragmentary view, looking from the plane of the line II—II of Figure I, showing the operating connections for releasing sand and exhaust pressure to project sand beneath the vehicle wheels; Figure III is a vertical sectional view on an enlarged scale, taken on the line III—III of Figure I, and showing the simpler form of our sand projector; and Figure IV is a similar view through a sand projector of modified form.

In the drawing reference numeral 1 designates the frame of an automobile, and reference numeral 2 designates the rear wheels of the automobile. Sand projectors, designated generally by reference numeral 3, are mounted immediately forward the wheels 2, as by being attached to the under surface of the automobile running-board. Each of the projectors 3 communicates by way of a conduit 4 with a sand receptacle 5, which is shown as having a constantly open delivery port 6 supplying the conduits 4. Also communicating with nozzles 3 are branches 7 leading from a by-pass 8 having control communication with exhaust pipe 9 of the automobile. Operation of the apparatus is controlled by means of an operating lever 10 accessible to the driver of the automobile, and serving by means of bevel gears 11 and 12 to rotate a shaft 13, connected by operating arm 14, and levers 14a and 14b with a transverse shaft 15 mounted in the machine frame, to rotate the shaft. Shaft 15 acts through cranks 16 and operating rods 16a to control the supply of sand to the projectors. Shaft 15 also acts through crank 17 and operating rod 17a to control a valve 18 in the exhaust line. This valve 18 may be of any suitable form capable of assuming a position to cut off by-pass connection 8 leading to the sand projectors 3, while permitting exhaust to pass freely through exhaust pipe 9, or to by-pass all or a portion of the exhaust gas to the sand projectors.

Considering Figure III of the drawing each said projector comprises a nozzle 19, having therein a sand supply port 20 receiving sand from one of the sand supply conduits 4. This sand supply port 20 is open or closed by means of a valve 21, connected by arm 21a with operating rod 16a. Each projector comprises a chamber 22 disposed rearwardly of nozzle 19, and the sand supply port therein. Chamber 22 is in communication with nozzle 19 by way of port 23, desirably provided, as shown, with a tube 23a, projecting a short distance into nozzle 19 and a substantial distance into chamber 22. Chamber 22 is in communication by way of port 24 with one of the exhaust branch lines 7. It should be particularly noted that port 24 is out of alignment with port 23, communicating with nozzle 19, and with the rearward terminal of tube 23a. A drip port 25 is disposed in the bottom of chamber 22, and is provided with a perforated cap 25a to prevent substantial loss of pressure from chamber 22 through this port. Cap 25a also protects the interior of chamber 22 from dust and dirt.

When need arises for the projection of sand beneath the automobile wheels, as by approach of the automobile to a patch of slippery surface on a highway, or by an initial skidding of the automobile on such surface, the driver operates lever 10 to rotate shaft 15. Because of the operating connections, which have been described, this action results in opening supply valve 21 to the projector nozzles 19, to permit sand to flow to the nozzles, and simultaneously by-passes exhaust pressure through by-pass 8, and branches 7 to the chamber 22 of each of the projectors.

Exhaust gas entering chamber 22 by way of port 24, out of line with communication port 23, undergoes a slight preliminary expansion, and a marked change of direction in its flow, thereby precipitating the major portion of the moisture carried by it. This moisture drains from the chamber by way of port 25, and is not carried by the exhaust gas into contact with the sand entering nozzle 19. There is thus no collection of moisture in the projector, and the gas in passing to use is freed of the greater proportion of its entrained moisture. It is of great importance in a projector of this nature that there should be no clogging of sand, even a momentary clogging, in the delivery nozzle. This is for the reason that sanding devices of this nature are designed to rectify conditions of emergency, and it is therefore necessary that they operate positively and instantaneously to deliver the sand.

It should be understood that branch connection may be made to some suitable source of fluid pressure other than the engine exhaust. Thus branch connection may be made without materially altering the general apparatus, and without any alteration in the sand projector, to the fluid pressure line carried by an automobile for operating its braking system. In this latter case it is merely necessary that the withdrawal of fluid pressure to the sand projectors should be so limited that the pressure system may not be bled to a point at which the brakes of the automobile become inoperative.

In the modified form of projector shown in Figure IV of the drawing the nozzle 26, and rearward chamber 27, are closely similar in their general form and arrangement to the corresponding parts shown in Figure III of the drawing. In this modified form of projector also the sand supply line communicates with a nozzle by a port 28, and has therein a control valve 29. In this modified form of projector, however, the supply of sand to the nozzle is controlled by fluid pressure in the chamber 27.

Chamber 27 has therein a port 30, communicating with a source of fluid pressure, such as the pressure chamber of a pneumatic braking system, or the exhaust line from the internal combustion engine of the vehicle. Slidably mounted in chamber 27 is a piston 31, which carries a tube 32 controlling communication between the chamber 27 and the nozzle 26. Tube 32 surrounds a tube 33, which is mounted in port 34 between chamber 27 and nozzle 26. A coil spring 44, bearing against the wall 35 separating the fluid pressure chamber and the nozzle, exerts a force urging piston 31 rearwardly toward port 30 in the chamber. When then piston 31 is in its furthest position assumed under the influence of spring 44, tube 32 lies against, or closely adjacent, the rearward wall of chamber 27. When, therefore, fluid pressure enters the chamber by way of port 30, it must first move piston 31 before the pressure can escape through tube 32 and tube 33 into nozzle 26.

The above arrangement produces an initial abrupt piston movement, which is utilized to open valve 29 in the sand supply line to the nozzle. Connections for this control comprise a rod 36 carried by the piston, and acting on valve 29 through pivoted lever arm 37.

This modified form of projector, also, has in the bottom thereof a drip port 38 surrounded by a perforated cap 39, and it may be noted that in this modified form of projector, also, the inlet port to the pressure chamber is out of alignment with the communication between the chamber and the nozzle. In this modified form of projector also, there is therefore a partial expansion of the fluid under pressure, and a directional change in the movement of the fluid, before it enters the nozzle and comes into contact with sand to be projected. This modified form of projector, also, thus provides for precipitation of the major portion of the moisture entrained with the fluid under pressure. The importance of precipitating such moisture has been explained above.

We claim as our invention:

1. In sanding apparatus for vehicles comprising a sand receptacle, a sand delivery conduit, engine exhaust connection for projecting sand delivered from said receptacle by way of said conduit, and control means operable at will for releasing sand from the receptacle and for directing engine exhaust to project the sand; a sand projector comprising a sand delivery nozzle, a sand supply port in said nozzle, and an exhaust-receiving chamber disposed rearwardly of the sand supply port in said nozzle and having a restricted outlet to the nozzle, said chamber having a port for the admission of exhaust gas disposed out of alignment with the communicating outlet to the nozzle, and a drip port in the bottom of the chamber, whereby moisture entrained with the exhaust gases is precipitated in a region removed from the sand, and is independently discharged from the projector.

2. The combination of the claim next preceding in which the communication outlet from the exhaust-receiving chamber to the sand-delivery nozzle is provided with a pressure directing tube.

3. In sanding apparatus for vehicles comprising a sand receptacle, a sand delivery conduit, connection to a source of fluid pressure for projecting sand delivered from said receptacle by way of said conduit, and control means operable at will for releasing sand from the receptacle and for directing fluid pressure to project the sand; a sand projector comprising a sand-delivery nozzle, a sand supply port in said nozzle, and a receiving chamber for fluid pressure disposed rearwardly of the sand supply port in said nozzle and having a restricted outlet to the nozzle, said chamber having a port for the admission of fluid disposed out of alignment with the communicating outlet to the nozzle, and a drip port in the bottom of the chamber, whereby moisture entrained with the fluid under pressure is precipitated in a region removed from the sand, and is independently discharged from the projector.

4. The combination of the claim next preceding in which the communication from the receiving chamber for fluid under pressure to the sand delivery nozzle is provided with a pressure directing tube.

5. In a sand projector for vehicular mounting the combination of a sand delivery nozzle, a sand supply line ported through the nozzle wall in a position out of axial alignment with the nozzle, a pressure line for directing fluid under pressure through said sand delivery nozzle, and a drained chamber mounted against the nozzle in longitudinal alignment with the rear of the nozzle, said chamber proportioned and arranged to provide a limited expansion of the fluid under pressure for the precipitation of moisture from the fluid prior to entrance of the fluid into the sand delivery nozzle.

6. In sanding apparatus for vehicles comprising a sand receptacle, a sand delivery conduit, connection to a source of fluid pressure for projecting sand delivered from said receptacle by way of said conduit, and control means operable at will for releasing sand from the receptacle and for directing fluid pressure to project the sand; a horizontally disposed sand projecting casing comprising a sand delivery nozzle, a sand supply port in said nozzle, and a receiving chamber for fluid pressure mounted in axial alignment with the nozzle rearwardly of the sand supply port in said nozzle, said chamber having outlet to the nozzle spaced from the lower wall region of the chamber and a port for the admission of fluid disposed out of alignment with the outlet communicating with the nozzle.

7. The combination of the claim next preceding in which the communication from the receiving chamber for fluid under pressure to the sand delivery nozzle is provided with a pressure directing tube extending a substantial distance into the said chamber.

8. In a sanding apparatus for vehicles comprising a sand receptacle, a sand delivery conduit, connection to a source of fluid pressure for projecting sand from said receptacle by way of said conduit, and control means operable at will for releasing sand from the receptacle and for directing fluid pressure to project the sand; a casing structure comprising in intimate structural association a sand delivery nozzle having a sand supply port thereto and a moisture precipitating chamber for the fluid pressure medium disposed rearwardly of the sand supply port to the nozzle, said chamber having inlet for fluid under pressure thereto and an outlet for fluid pressure to the nozzle spaced from the base of the chamber, and a drain for the discharge of moisture adjacent the base of the chamber.

9. The combination of the claim next preceding in which the communicating outlet from the precipitation chamber to the nozzle is provided with a pressure directing tube.

10. In sanding apparatus for vehicles comprising a sand receptacle, a sand delivery conduit, connection to source of fluid pressure for projecting sand from said receptacle by way of said conduit, and control means operable at will for releasing sand from the receptacle and for directing fluid pressure to project the sand; a casing structure comprising in intimate structural association a sand delivery nozzle having a sand supply port thereto and a moisture precipitating chamber for the fluid pressure medium disposed rearwardly of the sand supply port to the nozzle, said chamber having inlet for fluid under pressure and an outlet for fluid pressure to the nozzle spaced from the base of the chamber.

11. The combination of the claim next preceding in which the communicating outlet from the precipitation chamber to the nozzle is provided with a pressure directing tube extending rearwardly a substantial distance in the precipitation chamber.

MATHEW BORCHEK.
HARRY FINGAL.